(12) United States Patent
Faucher et al.

(10) Patent No.: US 12,357,960 B2
(45) Date of Patent: Jul. 15, 2025

(54) CASING FOR A GAS/LIQUID SEPARATION COLUMN

(71) Applicant: L'Air Liquide, Societe Anonyme pour l'Etude et l'Exploitation des Procedes Georges Claude, Paris (FR)

(72) Inventors: Vincent Faucher, Champigny sur Marne (FR); Manuel Dos Reis, Vitry sur Seine (FR); Vincent Maret, Vitry sur Seine (FR); Luis Torbado, Vitry sur Seine (FR); Alain Appel, Vitry sur Seine (FR); Eric Biret, Vitry sur Seine (FR); Laurent Leclerc, Vitry sur Seine (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 369 days.

(21) Appl. No.: 18/102,261

(22) Filed: Jan. 27, 2023

(65) Prior Publication Data
US 2023/0278004 A1 Sep. 7, 2023

(30) Foreign Application Priority Data
Feb. 1, 2022 (FR) .................................. 2200895

(51) Int. Cl.
*B01J 19/32* (2006.01)
(52) U.S. Cl.
CPC .................... *B01J 19/325* (2013.01)
(58) Field of Classification Search
CPC .................................................. B01J 19/325
(Continued)

(56) References Cited

U.S. PATENT DOCUMENTS

| 225,268 | A | * | 3/1880 | Boone | ................. | H02G 15/18 |
| | | | | | | 138/161 |
| 494,996 | A | * | 4/1893 | Dwelle | ................. | F16L 21/06 |
| | | | | | | 138/147 |

(Continued)

FOREIGN PATENT DOCUMENTS

FR 1 345 040 12/1963

OTHER PUBLICATIONS

French Search Report for FR 2 200 895, mailed Sep. 15, 2022.

*Primary Examiner* — Charles S Bushey
(74) *Attorney, Agent, or Firm* — Justin K. Murray

(57) ABSTRACT

A casing intended to be equipped with at least one section of packing for a gas/liquid separation column includes at least a tubular wall extending along a longitudinal direction between two longitudinal ends and an internal face of which contributes to delimiting a housing for the section of packing, the tubular wall contributing to delimiting, at one of its longitudinal ends, an entry opening, the casing including an end wall located at the opposite longitudinal end to the entry opening, the casing including at least a first hooping device and at least a second hooping device which are positioned around the tubular wall of the casing in contact with an external face of the tubular wall, the first hooping device including at least one zone of connection with a movement system for the moving of the casing, the second hooping device having a longitudinal dimension shorter than a longitudinal dimension of the first hooping device.

10 Claims, 4 Drawing Sheets

(58) Field of Classification Search
USPC .................................. 138/161; 202/158, 270
See application file for complete search history.

(56) References Cited

U.S. PATENT DOCUMENTS

| | | | | |
|---|---|---|---|---|
| 964,585 | A | * | 7/1910 | Traub et al. ............... F16L 9/01 285/407 |
| 973,503 | A | * | 10/1910 | Harry ........................ F16L 9/01 138/161 |
| 975,679 | A | * | 11/1910 | Dupree .................... B65D 9/38 217/91 |
| 2,685,964 | A | | 8/1954 | Brown |
| 2,761,707 | A | * | 9/1956 | Albert ...................... F16L 23/10 285/353 |
| 3,064,955 | A | * | 11/1962 | Boutte ................... B01D 3/326 202/158 |
| 3,193,129 | A | * | 7/1965 | Pfluger et al. ......... B65D 90/08 220/240 |
| 5,560,656 | A | * | 10/1996 | Okamura ................ F16L 23/18 285/379 |
| 2014/0131349 | A1 | | 5/2014 | Volkmann |
| 2014/0348619 | A1 | * | 11/2014 | Granger ................ B65B 65/003 414/809 |

* cited by examiner

[Fig. 1]
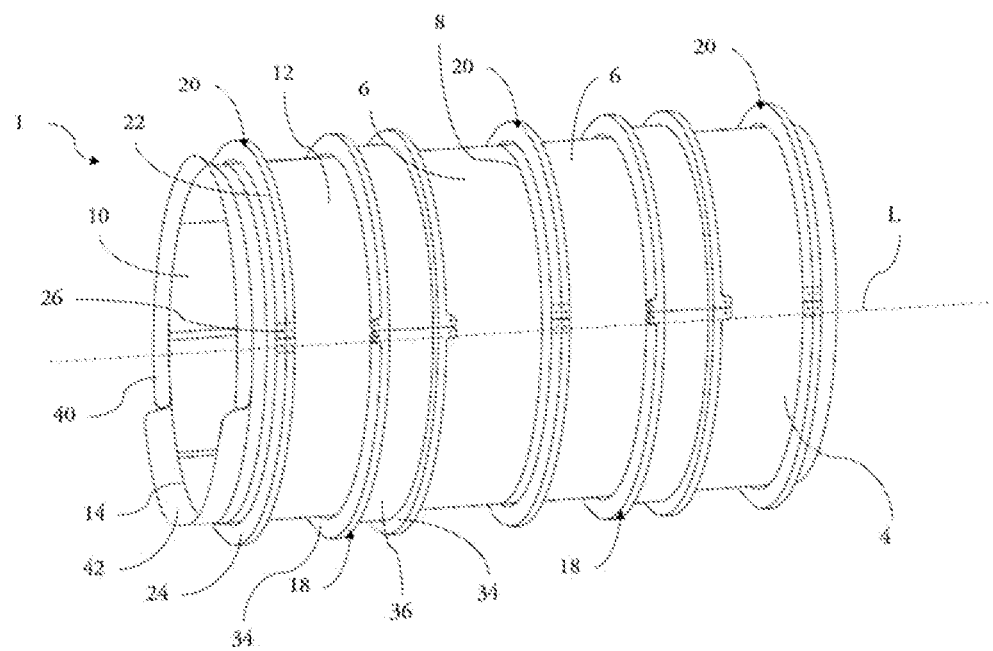
[Fig. 2]
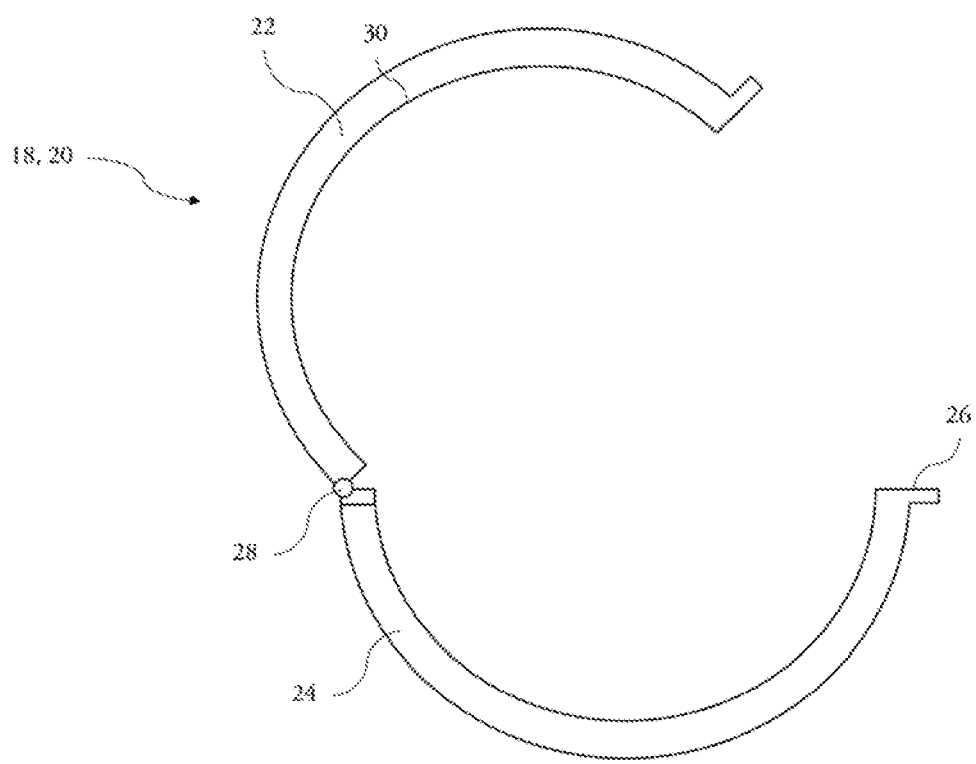

[Fig. 3]
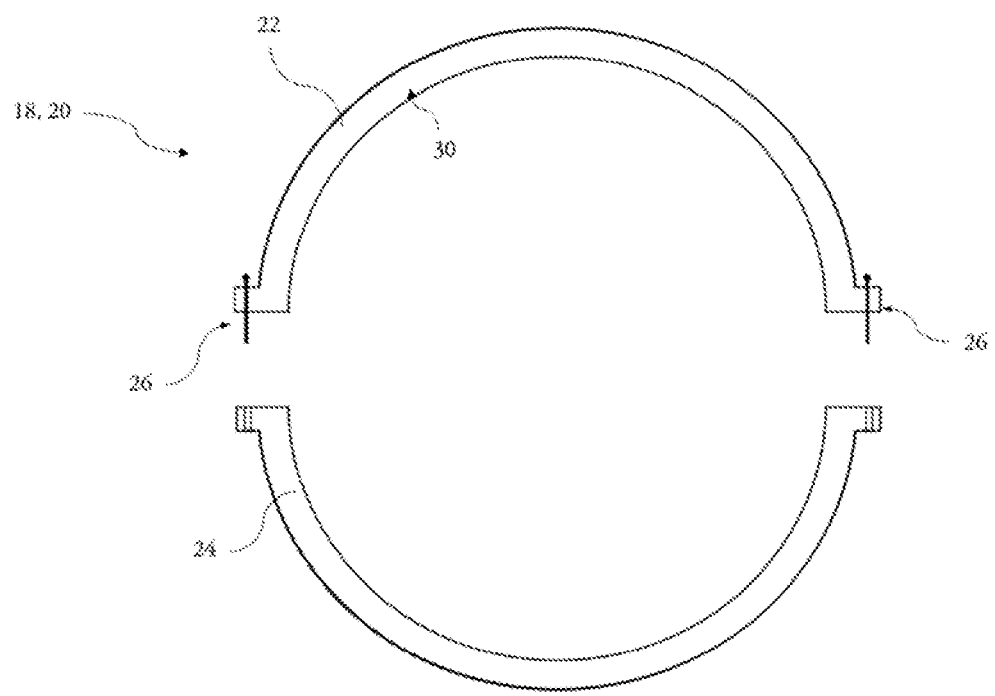

[Fig. 4]
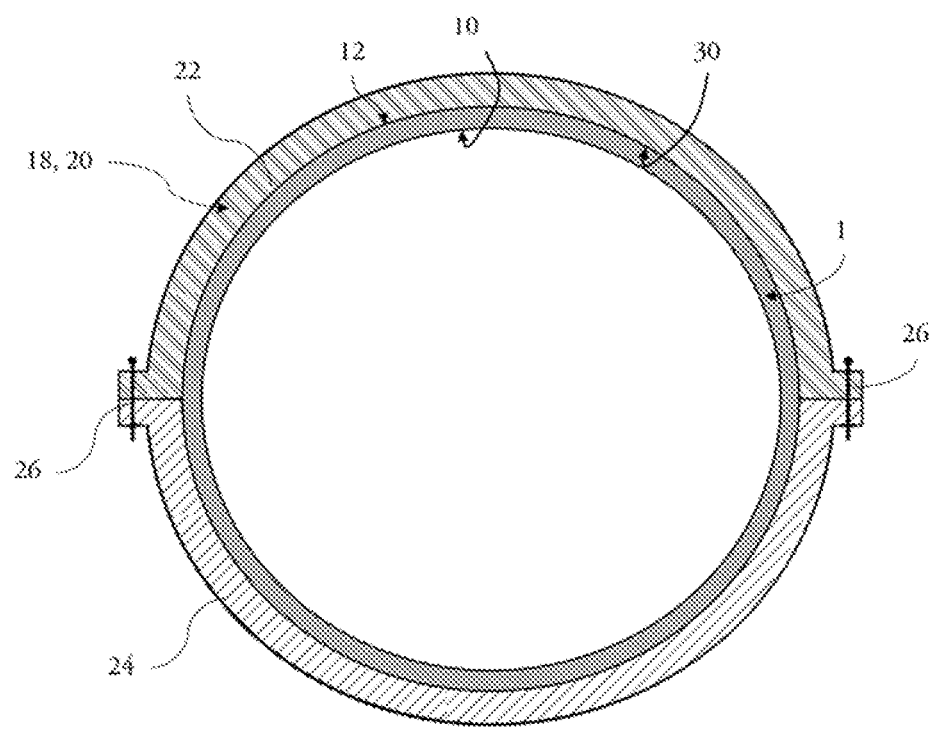

[Fig. 5]
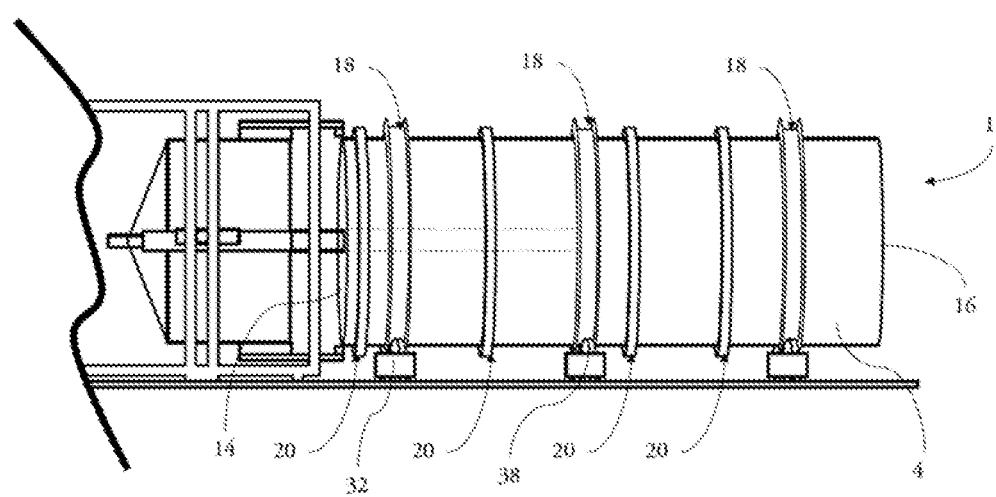

CASING FOR A GAS/LIQUID SEPARATION COLUMN

CROSS REFERENCE TO RELATED APPLICATIONS

This application claims the benefit of priority under 35 U.S.C. § 119 (a) and (b) to French patent application No. FR2200895, filed Feb. 1, 2022, the entire contents of which are incorporated herein by reference.

FIELD OF THE INVENTION

The present invention relates to the field of gas/liquid separation columns, and to their assembly, and it concerns more particularly a process for installing a section of packing in a casing in order to form these said gas/liquid separation columns.

BACKGROUND OF THE INVENTION

Gas/liquid separation columns have been known for many years and can be used, for example, to separate different chemical elements present in the composition of a homogeneous fluid, for example by distillation or by absorption.

Manufacturing a gas/liquid separation column comprises, in particular, a step of inserting a plurality of packing sections into a casing. The packing sections are used in columns in particular to ensure the exchange of material and heat between a rising gas and a falling liquid. These packing sections, which consist, in particular, of several superposed corrugated strips, are often referred to as "packs". The packing sections are conventionally stacked on each other, possibly with interposed separators, in order to help separate the components of the fluid along the axial dimension of the column.

It is known to proceed with the insertion of the sections of packing into a casing which is kept vertical, with the force of gravity greatly facilitating the progression of the section of packing inserted into the casing. However, such a method can prove restrictive when the gas/liquid separation columns to be assembled have a large diameter and an axial dimension that requires the use of long casings of the order of several tens of metres in length. Indeed, such methods in which the packing sections are inserted vertically then require a tool capable of lifting the packing sections a long distance in order to bring them to face the end of the casing and a production site with a ceiling higher than the length of the casing.

There is therefore a need, when long casings are used, for an assembly method in which the packing sections are inserted with the casing arranged horizontally. Such a position makes it difficult to insert the packing sections because this insertion requires a considerable pushing force along the whole length of the casing, with gravity no longer helping to move the packing section into the casing.

This force of gravity can also give rise to slight deformation of the casing, and make it complicated, on the one hand, to centre the section of packing relative to an inlet opening of the casing, facing which the section of packing must be positioned before being thrust into the interior of this casing and, on the other hand, to slide the section of packing into the housing of the casing.

SUMMARY OF THE INVENTION

In this context, the main subject of the present invention is a casing intended to be equipped with at least one section of packing for a gas/liquid separation column comprising at least a tubular wall extending along a longitudinal direction between two longitudinal ends and an internal face of which contributes to delimiting a housing for the section of packing, the tubular wall contributing to delimiting, at one of its longitudinal ends, an entry opening, the casing comprising an end wall located at the opposite longitudinal end to the entry opening, characterized in that the casing comprises at least a first hooping device and at least a second hooping device which are positioned annularly around the tubular wall of the casing in contact with an external face of the tubular wall, the first hooping device comprising at least one zone of connection with a movement system for the moving of the casing, the second hooping device having a longitudinal dimension shorter than a longitudinal dimension of the first hooping device.

In the present case, the casing is at risk of distorting under the effect of gravity and/or/the packing being forced into it and it is therefore being encircled with first and second hooping devices, to be compared with the hoops used for a wooden barrel or keg. These hooping devices help to apply circumferential stresses to the casing.

The casing advantageously and globally has a cylindrical form extending in the longitudinal direction, this direction being parallel to the axis of revolution of the said cylinder. It is understood from the foregoing, and from the assembly of the casing horizontally, that the longitudinal direction is substantially parallel to the ground on which the casing is installed during the process for installing the section of packing. This particular arrangement of the casing relative to the ground facilitates the insertion of the section of packing when the casing has a length, measured in a direction parallel to the longitudinal direction L, and a diameter, corresponding to the diameter of the cylinder, equal to approximately ten metres and/or more for example.

It will be appreciated here that the longitudinal direction L corresponds to the main direction of extension of the casing and more particularly to the axis of revolution of the casing, whether the casing is positioned horizontally or vertically.

Each of the hooping devices serves to ensure the circular symmetry of the casing, notably to prevent the sections of packing from becoming jammed as they are being inserted into the casing.

The longitudinal dimension of each of the hooping devices corresponds to the greatest dimension of said hooping device measured in a direction parallel to the longitudinal direction L. This longitudinal dimension is moreover measured between the two longitudinal end edges of the one same hooping device. The distinction between the hooping devices in terms of their longitudinal dimension is particularly great because the hooping device or devices having the greatest longitudinal dimension may perform a further function in addition to the function of preserving circular symmetry.

The casing comprises these hooping devices at least for the duration of the installation of the sections of packing into the casing. These hooping devices may then remain around the casing permanently or else may be removed with a view to using this casing for a gas/liquid separation column.

According to one feature of the invention, the longitudinal dimension of the at least one second hooping device is smaller by at least a factor of two than the corresponding longitudinal dimension of the first hooping device.

According to one optional feature of the invention, the longitudinal dimension of the first hooping device is comprised between 200 mm and 300 mm and may be of the order of 240 mm.

According to one optional feature of the invention, the longitudinal dimension of the second hooping device is comprised between 10 mm and 20 mm and may be of the order of 15 mm.

According to one optional feature of the invention, the first hooping device and the second hooping device are distinct from one another and are advantageously positioned some distance apart. Each of these hooping devices is furthermore at least partially in contact with said external face. It will be appreciated here that the first hooping device and the second hooping device have at least the function of ensuring the circular symmetry of the casing, to prevent the sections of packing from becoming jammed inside the casing during the insertion phase. The widest hooping device, in this instance the first hooping device, is used both to preserve the circular symmetry of the casing and to support the casing when the latter is lying down in a horizontal position during the insertion phase.

According to an optional feature of the invention, at least one of the hooping devices is configured to collaborate with a support device supporting the casing. More specifically, all the hooping devices of the one same type, in this instance the first hooping devices of longitudinal dimension greater than that of the second hooping devices, are intended to collaborate with a support device. In that way, the first hooping devices can be distinguished from the second hooping devices in that, while all have a function of preserving circular symmetry, only the first hooping devices have the additional function of collaborating with casing support means which may, where applicable, allow the casing to be moved translationally and allow the casing to rotate on itself.

According to another optional feature of the invention, the support device comprises at least one roller means able to collaborate with the corresponding first hooping device to guide the rotation of the casing about the longitudinal direction.

According to another optional feature of the invention, the tubular wall is formed of several wall portions arranged one after the other in the longitudinal direction, at least two successive wall portions between them forming a contact zone, one of the second hooping devices being positioned around this contact zone.

The second hooping device thus contributes to preserving the circular symmetry of the tubular wall of the casing in a zone, namely the zone of contact between two successive modules that make up this tubular wall, which is particularly sensitive to deformation of the casing under the effect of gravity.

According to another optional feature of the invention, at least one wall portion is welded to at least one other adjacent wall portion, the second hooping device being positioned around the zone of contact between said adjacent wall portions connected by a welded seam.

According to another optional feature of the invention, a second hooping device is installed around each of the zones of contact formed from one longitudinal end of the casing to the other.

According to another optional feature of the invention, each wall portion is welded to at least one other adjacent wall portion, a second hooping device being positioned around the welds between said wall portions.

According to another optional feature of the invention, one of the second hooping devices is installed at least in the vicinity of the entry opening of the casing. It should be noted that the longitudinal end of the casing at which the entry opening is made consists of a zone of the casing that is particularly fragile and that can easily become deformed under the effect of the weight of the casing. Such deformations are all the more damaging as they may prevent the insertion of a section of packing into the casing. The presence, at this longitudinal end, of a hooping device, and particularly of a second hooping device of which the longitudinal dimension is able to confer only a function of preserving circular symmetry, provides support for the tubular wall at the entry opening and ensures the entry opening sufficient circular symmetry that the sections of packing can be inserted without coming into contact with the tubular wall and risking deforming it under the thrusting force.

According to another optional feature of the invention, an internal face of one and/or the other of the hooping devices can be inscribed inside a circle of diameter greater than the diameter of the circle inside which the external face of the tubular wall can be inscribed. It should be appreciated that the corresponding hooping device is as close as possible to the tubular wall that forms the casing, and advantageously in contact therewith, in order to ensure the circular symmetry of the casing.

According to another optional feature of the invention, the first hooping device comprises two low radial walls connected to one another by a central strip, the low radial walls projecting radially from the central strip towards the outside of the casing. In other words, a cross section of the first hooping device, viewed in a plane in which the longitudinal direction is inscribed, adopts the shape of a "U", the low radial walls representing the arms of the "U", while the central strip represents the base of the "U". This U-shape contributes to forming a guideway in which a guidance system can be longitudinally immobilized. In other words, at least one of the low radial walls forms a longitudinal end stop for the drive system, both for longitudinal drive of the casing and for preventing the drive system from becoming dislodged from the guideway when the casing is rotated about its axis of revolution.

According to another optional feature of the invention, one and/or the other of the hooping devices comprises several parts securely joined to one another by a clamping device, the two parts being able to move between a position in which the hooping device is open, in which position the two parts are separated from one another, and a position in which the hooping device is closed, in which position the two parts encircle the casing at least partly in contact with the tubular wall of the casing.

The open position of the hooping device allows the parts of the hooping device to be separated so that they can be positioned around the casing, some distance from the tubular wall, at the start of the mounting of the one or more hooping devices on this casing, and the closed position of the hooping device corresponds to the position adopted by the two parts once the corresponding hooping device has been installed around the casing.

According to another optional feature of the invention, the clamping device is adjustable so as to adjust the position, relative to one another, of the two moving parts when the hooping device is in the closed position. In this way it can be ensured that, in the closed position, each of the parts of the hooping device is pressed as intimately as possible against the tubular wall of the casing, so as to maximize the extent to which deformations prejudicial to the circular symmetry of the casing in its horizontal position are avoided.

It will be appreciated that a clamping device is positioned at the junction between two adjacent moving parts. In instances in which the hooping device is formed by two moving parts, two diametrically opposite clamping devices may be provided, these respectively fixing one end of a first part of the hooping device to one end of a second part of the hooping device. It is also possible to provide just one clamping device diametrically opposite a hinge that permanently connects the two parts of the hooping device. In this latter instance, the two moving parts are said to be hinged and their end fixed by the clamping device consists in the opposite free end to the hinge.

According to another optional feature of the invention, the casing comprises several first hooping devices and several second hooping devices installed in an alternating sequence longitudinally one after the other. This then ensures that devices capable of maintaining the circular symmetry are uniformly present because each of the types of hooping device performs at least this function, and at the same time ensures a uniform positioning of hooping devices that are further capable of performing a function of guiding the casing.

According to another optional feature of the invention, the casing comprises a removable cone and/or a cradle installed at the entry opening of the casing and configured to assist with installing the section of packing in the casing, the second hooping device positioned in the vicinity of the entry opening being offset longitudinally so as not to cover a zone of connection between the casing and the installation-aid device formed by the removal cone and/or the cradle.

The present invention also relates to a method for installing a section of packing for a gas/liquid separation column into a casing characterized by any one of the preceding features, the method comprising at least a step of mounting the first hooping device and/or the second hooping device, and at least a step of installing the section of packing in the housing of the casing, which step is performed after the step of mounting the first hooping device and/or the second hooping device.

According to another optional feature of the invention, the casing extends vertically during the step of mounting the first hooping device and/or the second hooping device, the casing extending horizontally during the step of installing the section of packing.

In this way, the circular symmetry of the column is assured from the moment it adopts a horizontal position.

BRIEF DESCRIPTION OF THE DRAWINGS

Other features, details and advantages of the invention will become more clearly apparent from, on the one hand, reading the following description, and, on the other hand, from studying a plurality of embodiments given by way of non-limiting indication, with reference to the appended schematic drawings in which drawings:

FIG. 1 is a perspective depiction of a casing according to the invention, equipped with first hooping devices and with second hooping devices which are arranged in alternating sequence along the longitudinal dimension of the casing;

FIG. 2 is a face-on depiction of one of the hooping devices depicted in FIG. 1, in this instance in the open position and according to a first embodiment;

FIG. 3 is a face-on depiction of one of the hooping devices depicted in FIG. 1, in this instance in the closed position and according to a second embodiment;

FIG. 4 is a view in section, on a plane perpendicular to the longitudinal direction of the casing, of the hooping device depicted in FIG. 3 and installed around the casing:

FIG. 5 is a side-view depiction of the casing depicted in FIG. 1 during a step of an installation method according to the invention, in which step a section of packing is being inserted into the casing.

DETAILED DESCRIPTION OF THE INVENTION

The features, variants and the different embodiments of the invention can be associated with one another according to various combinations, provided that they are not mutually incompatible or mutually exclusive. In particular, it is possible to conceive of variants of the invention comprising only a selection of features described hereinafter, in a manner isolated from the other features described, if this selection of features is sufficient to provide a technical advantage and/or to differentiate the invention from the prior art.

In the figures, elements which are common to several figures retain the same reference.

FIG. 1 illustrates a casing 1 according to the invention, which is intended to accept at least one section of packing for a gas/liquid separation column. The casing 1 is notably positioned horizontally during installation of a section of packing into a casing 1, and comprises means able to carefully reduce the risk of the casing 1 becoming deformed during such installation.

The casing 1 extends mainly in a longitudinal direction L, thus having two longitudinal ends. The casing 1 is positioned horizontally during the installation of the section of packing, which is to say that the longitudinal direction L extends substantially parallel to the ground on which the casing 1 is installed.

More particularly, the casing 1 comprises at least one tubular wall 4, which extends mainly in the longitudinal direction L, having globally the form of a right cylinder, with the longitudinal direction L in this case corresponding to the main direction of extension of the tubular wall 4, and to its axis of revolution. In other words, a cross section of the tubular wall 4, seen on a plane perpendicular to the longitudinal direction L, is inscribed substantially in a circle.

The tubular wall 4 is advantageously formed of several wall portions 6 arranged one after the other in the longitudinal direction L, at least two successive wall portions 6 between them forming a contact zone 8. It will be appreciated that these wall portions 6 each form a tubular module that aligns with the tubular modules formed by the other wall portions 6, so as to form the casing 1.

According to one preferred embodiment of the invention, at least one wall portion 6 is welded, at one of its longitudinal ends, to at least another, directly adjacent, wall portion 6. Advantageously, each of the wall portions 6 is welded to the wall portions 6 that are directly adjacent to it.

The tubular wall 4 has an internal face 10 which is oriented towards the inside of the casing 1, and an external face 12 which faces towards the outside of the casing 1. The internal face 10 of the tubular wall 4 contributes to delimiting a housing for at least one section of packing.

The tubular wall 4 contributes to delimiting an entry opening 14 at one of the longitudinal ends of the casing 1. The entry opening 14 corresponds to the opening via which the sections of packing are inserted into the casing 1.

The casing 1 comprises an end wall 16, visible in FIG. 5, positioned at the other longitudinal end of the casing 1, namely at the opposite end to the entry opening 14. At least the first section of packing installed in the casing 1 is positioned in the vicinity of the end wall 16, if applicable against the end wall 16.

The section of packing adopts the overall shape of a cylindrical body which can be installed in the housing of the tubular wall 4. In other words, the section of packing has a peripheral edge of which the profile, seen in a plane perpendicular to the longitudinal direction L, is a circle, the diameter of which is equal to, or substantially smaller than, the diameter of the casing 1 at the internal face 10 of the tubular wall 4.

As previously stated, a section of packing for a gas/liquid separation column is notably made up of a superimposition of a plurality of corrugated and interlaced strips, and, during the operation of the gas/liquid separation column comprising this casing 1, the stack of these sections within a casing 1 makes it possible to ensure the exchange of material and heat between a rising gas and a descending liquid. The sections of packing are conventionally stacked on one another, if applicable with interposed separators. Obtaining a separation column thus involves insertion of sections of packing within the casing 1 one after another, via an appropriate insertion device, during a method for installing sections of packing.

According to the invention, the casing 1 comprises at least a first hooping device 18 and at least a second hooping device 20 which are positioned around the tubular wall 4 of the casing 1 in contact with an external face 12 of the tubular wall 4, as depicted in FIGS. 1 and 4. It will be appreciated that each of the hooping devices 18, 20 is installed around the casing 1, which is to say with an annular shape surrounding the tubular wall 4 of the casing 1 and the axis of which is substantially coincident with the longitudinal axis of revolution of the casing.

Each of these hooping devices 18, 20 is at least partially in contact with the external face 12 of the casing 1 to ensure the circular symmetry of the casing 1. More specifically, the first hooping device 18 and the second hooping device 20 are advantageously in contact with the external face 12 of the tubular wall 4 over the entirety of the periphery of the casing 1. Thus, the first hooping device 18 and the second hooping device 20 each participate at least in preserving the circular symmetry of the casing 1. It will be appreciated that the hooping devices contribute to maintaining the cylindrical shape of the casing 1 by limiting the deformations that the casing 1 may experience during installation of the section of packing.

As particularly visible in FIGS. 1 and 5, the casing 1 comprises several first hooping devices 18 and several second hooping devices 20 installed in an alternating sequence longitudinally one after the other. In other words, one of the first hooping devices 18 is positioned between two second hooping devices 20 and/or one of the second hooping devices 20 is positioned between two first hooping devices 18, in the longitudinal direction L. More advantageously still, each of the first hooping devices 18 and respectively each of the second hooping devices 20, is flanked longitudinally by at least one second hooping device 20 and respectively by at least one first hooping device 18.

The casing is notably specific in that it exhibits two types of hooping device which can be distinguished from one another in terms of their shape and notably in terms of their longitudinal dimension. More specifically, and as visible in FIGS. 1 and 5, the second hooping device 20 has a longitudinal dimension shorter than a longitudinal dimension of the first hooping device 18. It will thus be appreciated that a first feature that differentiates between the first hooping device 18 and the second hooping device 20 concerns the longitudinal dimensions thereof. The longitudinal dimension of each of the hooping devices 18, 20 in this instance corresponds to the greatest dimension of said hooping device 18, 20 measured in a direction parallel to the longitudinal direction L. In other words, the separation between the longitudinal end edges of the first hooping device 18 is greater than the separation between the longitudinal end edges of the second hooping device 20.

As will be mentioned hereinafter, the longitudinal dimension differs from one type of hooping device to the other because of the difference in the functions associated with each type of hooping device.

The longitudinal dimension of the first hooping device 18 may notably be comprised between 200 mm and 300 mm and more specifically may be at least 240 mm. However, it should be noted that the longitudinal dimension of the first hooping device 18 may vary according to the dimensions of the casing 1 so that a casing 1 having dimensions smaller than those of another casing may be equipped with hooping devices with longitudinal dimensions different from those of the hooping devices intended to equip the other casing.

In other words, the first hooping device forms a runway strip on which the means for guiding and/or supporting the casing are able to roll.

The longitudinal dimension of the second hooping device 20 may notably be comprised between 10 mm and 20 mm and more specifically may be of the order of 15 mm. Similarly to that which was mentioned hereinabove with regard to the first hooping device 18, the longitudinal dimension of the second hooping device 20 may also vary according to the dimensions of the casing 1.

In other words, the second hooping device 20 consists of an annular ring of which the thickness, here determined by the aforementioned longitudinal dimension, is less than the height, which is to say the radial dimension perpendicular to the axis of the hooping device.

The first hooping device 18 and the second hooping device 20 are distinct from one another and are advantageously positioned some distance apart. It will be appreciated here that, on the one hand, the first hooping device 18 and the second hooping device 20 do not collaborate with one another mechanically and that, on the other hand, the first hooping device 18 is not in contact with a longitudinal end edge of an adjacent second hooping device 20.

As has been mentioned, each of the hooping devices 18, 20 is intended to be in contact, at least partially and advantageously over the entire periphery of the casing 1, with the external face 12 of the tubular wall 4.

To that end, one and/or the other of the hooping devices 18, 20 comprises several distinct parts 22, 24, in this instance two of them, able to move relative to one another and secured to one another to form the corresponding hooping device by at least one clamping device 26. More specifically, the parts 22, 24 may adopt a position in which the hooping device is open, in which position the parts 22, 24 are distant from one another, and the clamping device 26 is not in action, as visible in FIG. 2 or FIG. 3, and a position in which the hooping device is closed, in which position the parts 22, 24 encircle the casing 1, and are secured to one another by the at least one clamping device, as visible in FIG. 4.

The open position of the clamping device here corresponds to the position adopted by the parts 22, 24 of the one same hooping device at the start of same being mounted on the casing, the separation of these parts relative to one another allowing them to be positioned around the tubular wall of the casing against which the parts are intended to be in contact.

In a first embodiment illustrated in FIG. 2, the two parts 22, 24 that formed the one same hooping device are articulated by a hinge 28 and the corresponding hooping device comprises a single clamping device 26 configured to secure together the two parts 22, 24 when the hooping device 18, 20 is in the closed position. The clamping device 26 is a device that is adjustable so that the clamping of each of the parts 22, 24 with respect to the other can be adapted, thereby adapting the force with which the parts are pressed intimately against the external face 12 of the casing 1.

In that case, the clamping device 26 is positioned at one free end of each of the parts 22, 24 which is the opposite end to the end of said part 22, 24 at which the hinge 28 is installed.

In a second embodiment, notably illustrated in FIG. 3, the two parts 22, 24 are distinct from one another and are not joined by a hinge at one of their ends. The parts 22, 24 of the one same hooping device may thus be brought to face the tubular wall 4 of the casing 1 independently of one another, making it easier for these to be positioned around the casing in environments which may be cluttered. In that case, two clamping devices 26, in this instance diametrically opposite, are provided, each clamping device being adjustable. Once again, the use of the adjustable clamping device 26 allows the parts of the one same hooping device to be fixed together while ensuring that the internal face 30 of the hooping device 18, 20 is correctly pressed intimately against the external face 12 of the tubular wall 4.

The adjusting device 26 may notably comprise clamping flanges which are respectively secured to an end of the parts of the hooping device that are intended to be joined together and one or more clamping screws allowing the clamping force to be modulated according to the contact of the parts with the tubular wall. In particular, the clamping flanges may be formed as one with the parts that form the hooping device.

Whatever the embodiment employed, and therefore whatever the number of clamping devices, it should be noted that the function of each clamping device is to bring the two parts of the hooping device closer to one another so that the internal face 30 of the corresponding hooping device 18, 20 is in contact with the external face 12 of the casing 1 over the largest possible surface area.

Once the hooping device 18, 20 has been mounted on the casing by clamping these two parts 22, 24 together, an internal face 30 of this hooping device 18, 20 can be inscribed inside a circle of a diameter substantially equal to the diameter of the circle in which the external face 12 of the tubular wall 4 can be inscribed.

As mentioned previously, the longitudinal dimension of a first clamping device 18 is greater than that of a second clamping device 20, and notably at least a factor of two greater. Thus, in addition to performing its function of maintaining the circular symmetry of the casing 1, each first hooping device 18 also contributes to collaborating with a support device 32 supporting the casing 1 and notably visible in FIG. 5, which allows the casing to be positioned some distance off the ground while the sections of packing are being inserted, and which may allow the casing to be moved translationally along the ground of the workshop and may where applicable allow the casing to be rotated on itself about its longitudinal axis of revolution.

For this purpose, the first hooping device 18 adopts the form of an annular strip, having two low radial walls 34 connected to one another by a central strip 36, the low radial walls 34 projecting radially, towards the outside of the casing 1, from the central strip 36 at each longitudinal end of this strip. In other words, the first hooping device 18 adopts an annular guideway shape having a U-shaped cross section when viewed in a plane in which the longitudinal direction L can be inscribed, the low radial walls 34 representing the uprights of the "U" while the central strip 36 represents the base of the "U".

The central strip 36 is thus delimited longitudinally by the low radial walls, and the guideway thus formed is dimensioned to house the support device 32 supporting the casing 1.

The support device 32 may be borne by a carriage to allow the casing to be moved around translationally, where applicable along rails present in the workshop in which the installation of the sections of packing is to be performed.

The support device 32 more particularly comprises at least one rolling means 38 collaborating with the first hooping device 18, which is to say being at least partially housed in the abovementioned guideway notably delimited by each of the low radial walls 34 and by the central strip 36. It will be appreciated that the casing positioned horizontally rests on each of the support devices with, more particularly, the central strip 36 of each first hooping device 18 resting against the periphery of the rolling means 38 of a corresponding support device. The rolling means 38 is mounted with the freedom to rotate so that it guides the rotation on itself of the casing, which rotation an operator may deem to be necessary between the insertion of two successive sections of packing, so as to adapt the relative position of the sections of packing with respect to one another within the casing 1 and thus optimize the gas/liquid separation intended to be performed within the casing once all the sections of packing have been installed.

In this guideway arrangement, with the guideway longitudinally delimited by the low radial walls 34 of the first hooping device 18, at least one low radial wall 34 forms a longitudinal end stop for the movement of the support device 32. In that way, one and/or the other of the low radial walls of a first hooping device makes it possible to prevent the rolling means 38 from escaping as the casing rotates on itself, and allows the casing in its entirety to be driven in a translational movement with each rolling means pressing against one of the low radial walls of the corresponding first hooping device.

At least one hooping device, in this instance a second hooping device 20, is positioned around one of the contact zones 8 formed between two wall portions 6 of the tubular wall 4 of the casing 1. It will be appreciated that the function of this second hooping device 20 is solely to contribute to preserving the circular symmetry of the casing 1, and that installing said second hooping device 20 around the contact zone 8 optimizes the preservation of the circular symmetry of the casing 1 overall in a zone that is particularly sensitive to potential local collapse under the effect of gravity.

In particular, the contact zone 8 may consist of a welded seam made between two successive wall portions and the hooping device, in this instance the second hooping device 20, is positioned around the welded seam between the two wall portions 6.

Advantageously, a second hooping device 20 is installed around each of the contact zones 8. This clever placement of the second hooping devices 20 makes it possible to ensure that the circular symmetry of the casing 1 is preserved at various sensitive points of this casing.

As an alternative or in addition, one of the second hooping devices 20 is installed near the longitudinal end of the casing 1 that contributes to delimiting the entry opening 14. In particular, such a second hooping device may be positioned between 50 and 150 mm from the entry opening. In accordance with that which has been able to be mentioned in respect of the contact zones 8, the entry opening 14 is one of the zones of the casing 1 that is most susceptible to deformations in its circular symmetry. Positioning a hooping device in this zone here makes it possible to maintain the theoretical circular shape of the tubular wall 4 at the entry opening 14 thus reducing the risk of a section of packing coming into contact with the edge of the tubular wall delimiting the entry opening 14.

It follows from the foregoing that a hooping device, and notably a second hooping device that has the sole function of preserving the circular symmetry of the casing, is advantageously positioned at each end of a wall portion 6 of the tubular wall 4, these ends forming fragile zones of the casing which are susceptible to collapse most quickly thus creating an impediment to the insertion of the sections of packing. Only the end of a wall portion 6 corresponding to the end wall 16 of the casing 1 is not surrounded by a hooping device, the end wall preventing the casing from collapsing under its self-weight and losing its circular symmetry.

It may thus be noted that the different types of hooping device may advantageously be positioned relative to one another according to their position along the casing and more particularly according to the portion of casing with which they are in contact. Hooping devices that have the sole function of maintaining circular symmetry and which will not be subjected to the stresses imposed by a support device as the casing is moved rotationally or translationally, are thus more able to be positioned in contact with the most fragile zones of the casing, whether these be the aforementioned contact zones 8 or the entry opening 14.

Moreover, and as visible in FIG. 1, the casing 1 may comprise a removable cone 40 and/or a cradle 42 which are installed at the entry opening 14 of the casing 1 and configured respectively to help with the installation of a section of packing into the casing 1. The removable cone 40) contributes to the radial guidance of the section of packing that is to be inserted so that it is offered up coaxial with the entry to the casing, and the cradle 42 is configured to act as a support on which the section of packing rests before being inserted into the casing. In such instances, the second hooping device 20 intended to be positioned near the entrance opening may exhibit a small axial offset to allow operations of fitting and removing these devices that assist with the installation of the section of packing, while the second hooping device is in position around the casing.

The present invention also relates to a method for installing a section of packing in the casing 1, the method comprising at least a step of mounting the first hooping device 18 and/or the second hooping device 20, and at least a step of installing the section of packing in the housing 13 of the casing 1, which step is performed after the step of mounting the first hooping device 18 and/or the second hooping device 20. The first hooping device 18 and/or the second hooping device 20 need to be mounted before the section of packing is installed so that the hooping devices can prevent the tubular wall 4 of the casing 1 from deforming during installation of the section of packing and from blocking the insertion of this section of packing into the casing.

It is notable that the casing 1 may need to change position during the course of the installation method, because the casing 1 extends vertically during the step of mounting the first hooping device 18 and/or the second hooping device 20, and extends horizontally during the step of installing the section of packing. The invention effectively falls within this context in which the insertion of the sections of packing is performed with a casing horizontal, and it is advantageous for the hooping devices to be mounted while the casing is vertical, so as to facilitate the positioning of the two parts of a hooping device on each side of the casing before these parts are fixed together. However, it will be appreciated that the casing 1 may be in a vertical position, which is to say with a longitudinal direction L substantially perpendicular to the ground, or in a horizontal position, which is to say with the longitudinal direction L substantially parallel to the ground, at the time of the mounting of the hooping devices.

As has just been described and illustrated, the present invention does indeed meet its set objectives, namely of proposing a combination of means able to preserve the circular symmetry of a casing prior to and during the course of insertion of sections of packing into it. It is advantageous for the casing to comprise different types of hooping device which can be distinguished from one another at least in terms of their longitudinal dimension, so that it is possible to position along the casing both a first type of device, able both to preserve the circular symmetry of the casing during the installation of a section of packing and able to bring the casing into a desired position in collaboration with a support device, and a second type of device having the sole function of maintaining the circular symmetry and which therefore does not experience the stresses of movement imposed by a support device and which can therefore advantageously be installed at the most fragile zones of the casing, and notably the zones of contact between two adjacent casing wall portions and/or the casing entry opening via which the sections of packing are inserted.

However, the present invention is not limited to the means and configurations described and illustrated here, and also extends to any equivalent means and configuration, as well as to any technically operative combination of such means.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

We claim:

1. A casing configured to be equipped with at least one section of packing for a gas/liquid separation column, the casing comprising:
    at least a tubular wall extending along a longitudinal direction between two longitudinal ends and an internal face of which contributes to delimiting a housing for the section of packing, the tubular wall contributing to delimiting, at one of its longitudinal ends, an entry opening;
    an end wall located at the opposite longitudinal end to the entry opening,
    a first hooping device and a second hooping device which are positioned annularly around the tubular wall of the casing in contact with an external face of the tubular wall, the first hooping device comprising at least one zone of connection with a movement system for the moving of the casing, the second hooping device having a longitudinal dimension shorter than a longitudinal dimension of the first hooping device.

2. The casing according to claim 1, wherein the longitudinal dimension of the at least one second hooping device is smaller by at least a factor of two than the corresponding longitudinal dimension of the first hooping device.

3. The casing according to claim 1, wherein the tubular wall is formed of several wall portions arranged one after the other in the longitudinal direction, at least two successive wall portions between them forming a contact zone, one of the second hooping devices being positioned around this contact zone.

4. The casing according to claim 1, wherein one of the second hooping devices is installed at least in the vicinity of the entry opening of the casing.

5. The casing according to claim 1, wherein an internal face of one and/or the other of the hooping devices can be inscribed inside a circle of diameter greater than the diameter of the circle inside which the external face of the tubular wall can be inscribed.

6. The casing according to claim 1, wherein the first hooping device comprises two low radial walls connected to one another by a central strip, the low radial walls projecting radially from the central strip towards the outside of the casing.

7. The casing according to claim 1, wherein one and/or the other of the hooping devices comprises several parts securely joined to one another by a clamping device, the two parts being able to move between a position in which the hooping device is open, in which position the two parts are separated from one another, and a position in which the hooping device is closed, in which position the two parts encircle the casing at least partly in contact with the tubular wall of the casing.

8. The casing according to claim 1, comprising several first hooping devices and several second hooping devices installed in an alternating sequence longitudinally one after the other.

9. A method for installing a section of packing for a gas/liquid separation column into a casing according to claim 1, the method comprising the step of:
    mounting the first hooping device and/or the second hooping device; and
    installing the section of packing in the housing of the casing, which step is performed after the step of mounting the first hooping device and/or the second hooping device.

10. The method for installing a section of packing as claimed in claim 9, wherein the casing extends vertically during the step of mounting the first hooping device and/or the second hooping device, and wherein the casing extends horizontally during the step of installing the section of packing.

* * * * *